(12) United States Patent
Tamarindo

(10) Patent No.: US 11,046,505 B2
(45) Date of Patent: Jun. 29, 2021

(54) OXYGEN IMPERMEABLE SPOUT FOR A FLEXIBLE POUCH

(71) Applicant: GUALA PACK S.p.A., Alessandria (IT)

(72) Inventor: Stefano Tamarindo, Alessandria (IT)

(73) Assignee: GUALA PACK S.P.A., Alessandria (IT)

( * ) Notice: Subject to any disclaimer, the term of this patent is extended or adjusted under 35 U.S.C. 154(b) by 370 days.

(21) Appl. No.: 15/120,706

(22) PCT Filed: Feb. 17, 2015

(86) PCT No.: PCT/IB2015/051171
§ 371 (c)(1),
(2) Date: Aug. 22, 2016

(87) PCT Pub. No.: WO2015/125071
PCT Pub. Date: Aug. 27, 2015

(65) Prior Publication Data
US 2017/0008207 A1    Jan. 12, 2017

(30) Foreign Application Priority Data

Feb. 24, 2014   (IT) .............................. BS2014A0049

(51) Int. Cl.
| | | |
|---|---|---|
| B65D 85/72 | (2006.01) |
| B29C 45/17 | (2006.01) |
| B29C 45/14 | (2006.01) |
| B65D 5/74 | (2006.01) |
| B65D 75/58 | (2006.01) |
| B29K 23/00 | (2006.01) |
| B29L 31/00 | (2006.01) |

(52) U.S. Cl.
CPC ........ *B65D 85/72* (2013.01); *B29C 45/14073* (2013.01); *B29C 45/14598* (2013.01);
(Continued)

(58) Field of Classification Search
CPC .......... B29C 45/1771; B29C 45/14073; B29C 45/14598; B65D 5/746; B65D 75/5883;
(Continued)

(56) References Cited

U.S. PATENT DOCUMENTS 4,988,472 A  *  1/1991  Orimoto ............... B29C 33/126
                                                264/273
2006/0201967 A1    9/2006  Romer
(Continued)

FOREIGN PATENT DOCUMENTS

| EP | 1 219 545 A2 | 7/2002 |
| EP | 1 449 784 A1 | 8/2004 |

(Continued)

OTHER PUBLICATIONS

International Search Report for corresponding International Patent Application No. PCT/IB2015/051171 dated May 26, 2015, 5 pgs.

*Primary Examiner* — Michael M. Robinson
(74) *Attorney, Agent, or Firm* — Merchant & Gould P.C.

(57) ABSTRACT

A spout (1) for a flexible pouch (100) for liquid food, such as fruit juices, yogurt, fruit or vegetable purees and the like, includes a tubular barrier (30) embedded in the tube (18), made of a material impermeable to atmospheric oxygen. The spout is made by molding equipment that includes a counter-mold (300) with fixed insert (302) and a movable skirt (304), slidably fitted on the fixed insert (302). The spout may be made by a production method in which, during the injection of a first oxygen permeable plastic material, the skirt (304) is moved, coming out of the barrier (30), which remains in a fixed initial position.

16 Claims, 5 Drawing Sheets

(52) U.S. Cl.
CPC .......... *B29C 45/1771* (2013.01); *B65D 5/746* (2013.01); *B65D 75/5883* (2013.01); *B29K 2023/06* (2013.01); *B29K 2023/12* (2013.01); *B29L 2031/712* (2013.01)

(58) Field of Classification Search
CPC ................ B65D 85/72; B29K 2023/06; B29K 2023/12; B29L 2031/712
See application file for complete search history.

(56) References Cited

U.S. PATENT DOCUMENTS

| | | | |
|---|---|---|---|
| 2009/0008416 A1* | 1/2009 | Kurosawa | B29C 45/14598 222/566 |
| 2012/0038083 A1* | 2/2012 | Pollmann | B29C 45/14073 264/272.15 |

FOREIGN PATENT DOCUMENTS

| | | |
|---|---|---|
| EP | 1 992 568 A1 | 11/2008 |
| EP | 2 076 448 A1 | 7/2009 |
| FR | 2 882 960 A1 | 9/2006 |
| JP | 2001-213455 A | 8/2001 |
| JP | 2002-255200 A | 9/2002 |
| JP | 2008-087786 A | 4/2008 |
| WO | 2004/013008 A1 | 2/2004 |
| WO | 2007/006163 A1 | 1/2007 |

* cited by examiner

OXYGEN IMPERMEABLE SPOUT FOR A FLEXIBLE POUCH

This application is a National Stage Application of PCT/IB2015/051171, filed 17 Feb. 2015, which claims benefit of Serial No. BS2014A000049, filed 24 Feb. 2014 in Italy and which applications are incorporated herein by reference. To the extent appropriate, a claim of priority is made to each of the above disclosed applications.

BACKGROUND OF THE INVENTION

The present invention relates to a spout for pouches of liquid or semi-dense substances, typically for use with food, such as fruit juices, yoghurt, fruit or vegetable purées and the like. In particular, the present invention relates to a spout for a flexible pouch and a production method of a spout.

The sector of flexible pouches with spouts for food use has been developing for some time now thanks to the versatility and convenience of use thereof.

Fruit juices, fruit or vegetable purées and the like however are not easy to manage; these substances are generally easily perishable tending to oxidation when exposed to air.

For this reason, the flexible pouches are usually composed of two films consisting of at least one layer in oxygen impermeable material, for example aluminium, while the spout, made of plastic material, is welded in an airtight manner to the pouch and closed by a cap.

The plastic material of the spout however is not oxygen impermeable, so that despite the precautions spoken of, the food substances contained in the pouch come into contact with atmospheric oxygen, tending to oxidation, over a varying period of time.

From the commercial point of view, such drawback reduces the shelf life of the pouch; the pouch must in fact be withdrawn after a few weeks so to not offer the consumer a substance in the process of oxidation, unsatisfactory although harmless from a health perspective.

SUMMARY OF THE INVENTION

The purpose of the present invention is to provide a spout for pouches and a production method able to overcome the aforesaid drawbacks.

BRIEF DESCRIPTION OF THE DRAWINGS

The characteristics and advantages of the spout and of the method according to the present invention will be evident from the following description, made by way of a non-limiting example, with reference to the attached drawings, wherein.

DETAILED DESCRIPTION OF THE PREFERRED EMBODIMENTS

Figure 1:
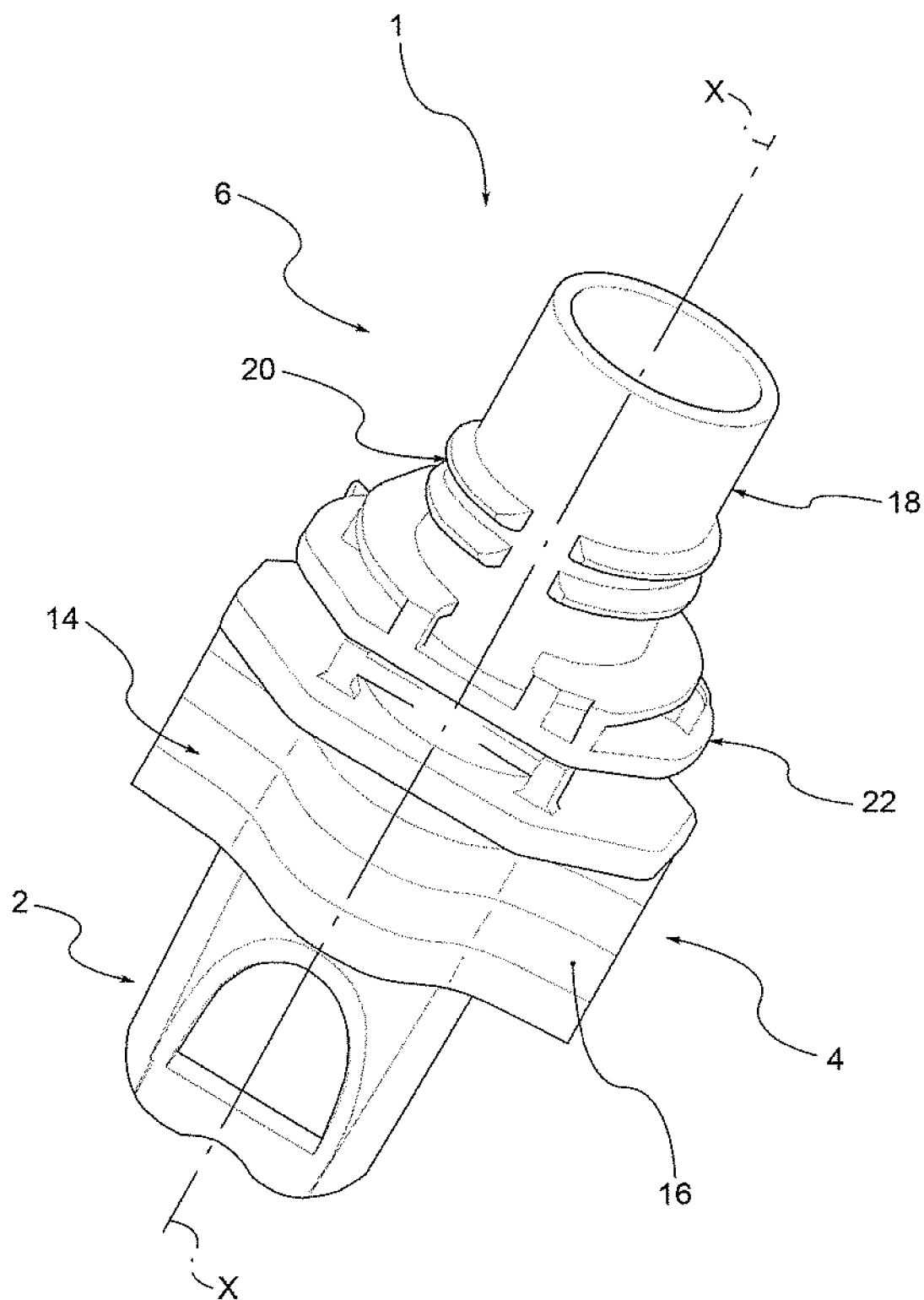
FIG. 1 shows a spout for pouches according to one embodiment of the present invention.
Figure 2:
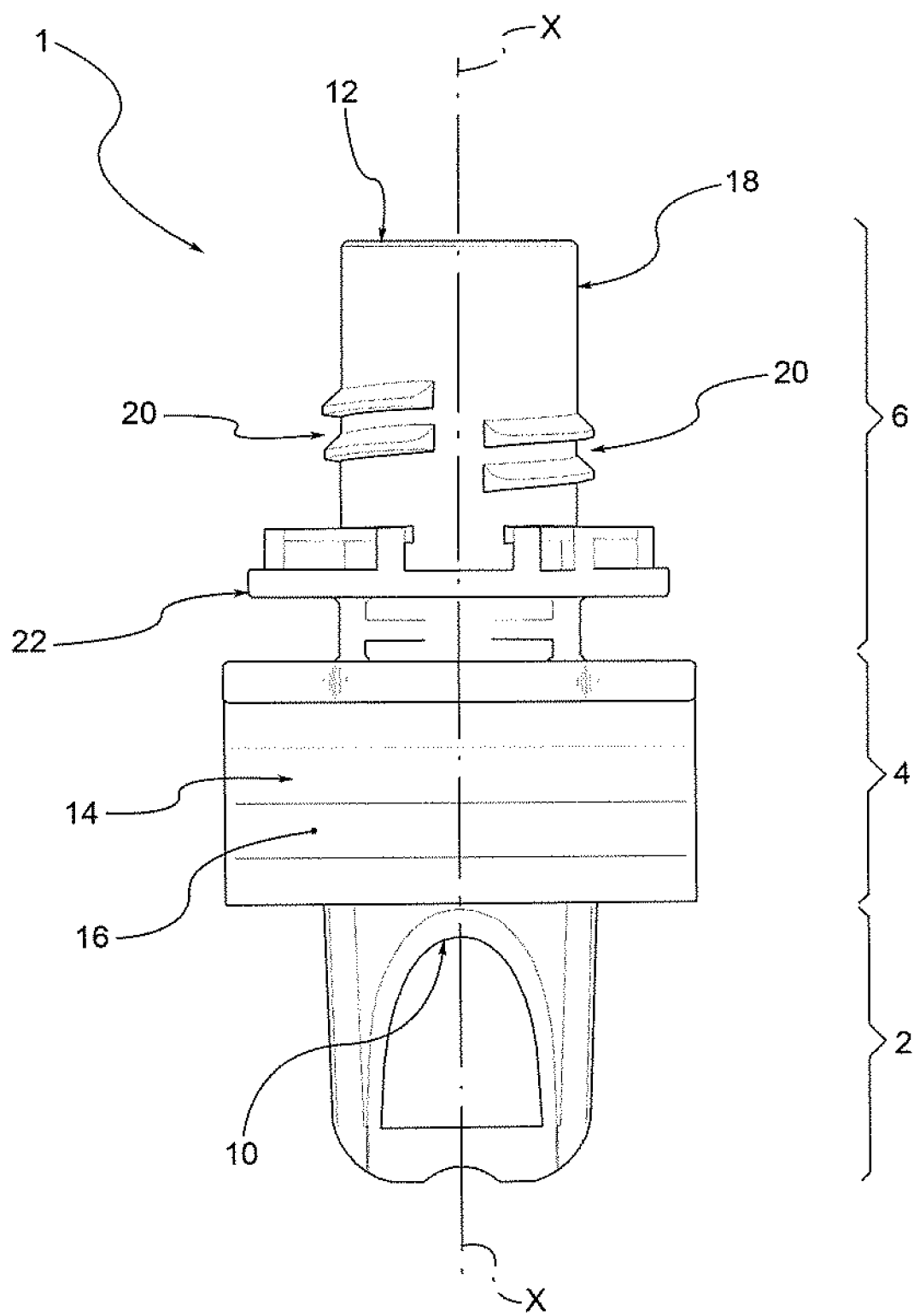
FIG. 2 shows a view of the spout in FIG. 1.
Figure 4:
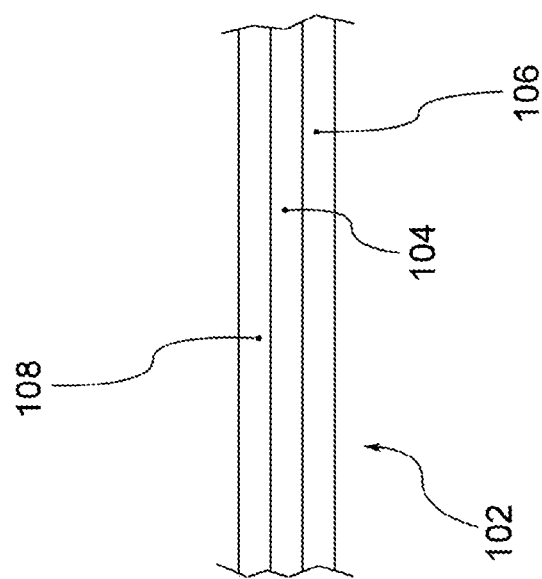
FIG. 4 shows a multilayer film for the pouch in FIG. 3.
Figure 3:
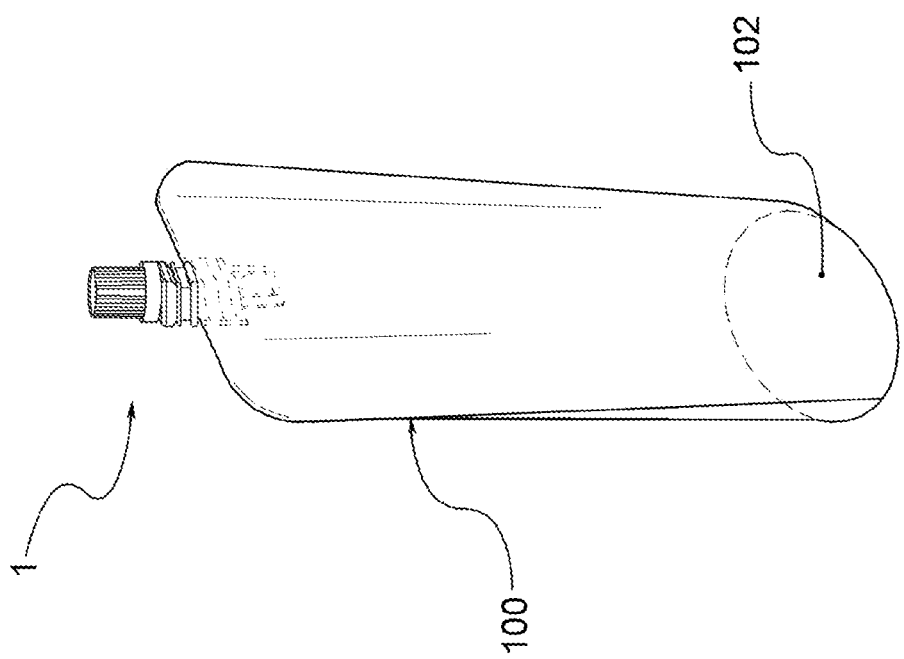
FIG. 3 shows a package consisting of a flexible pouch and a spout according to the present invention.
Figure 5:
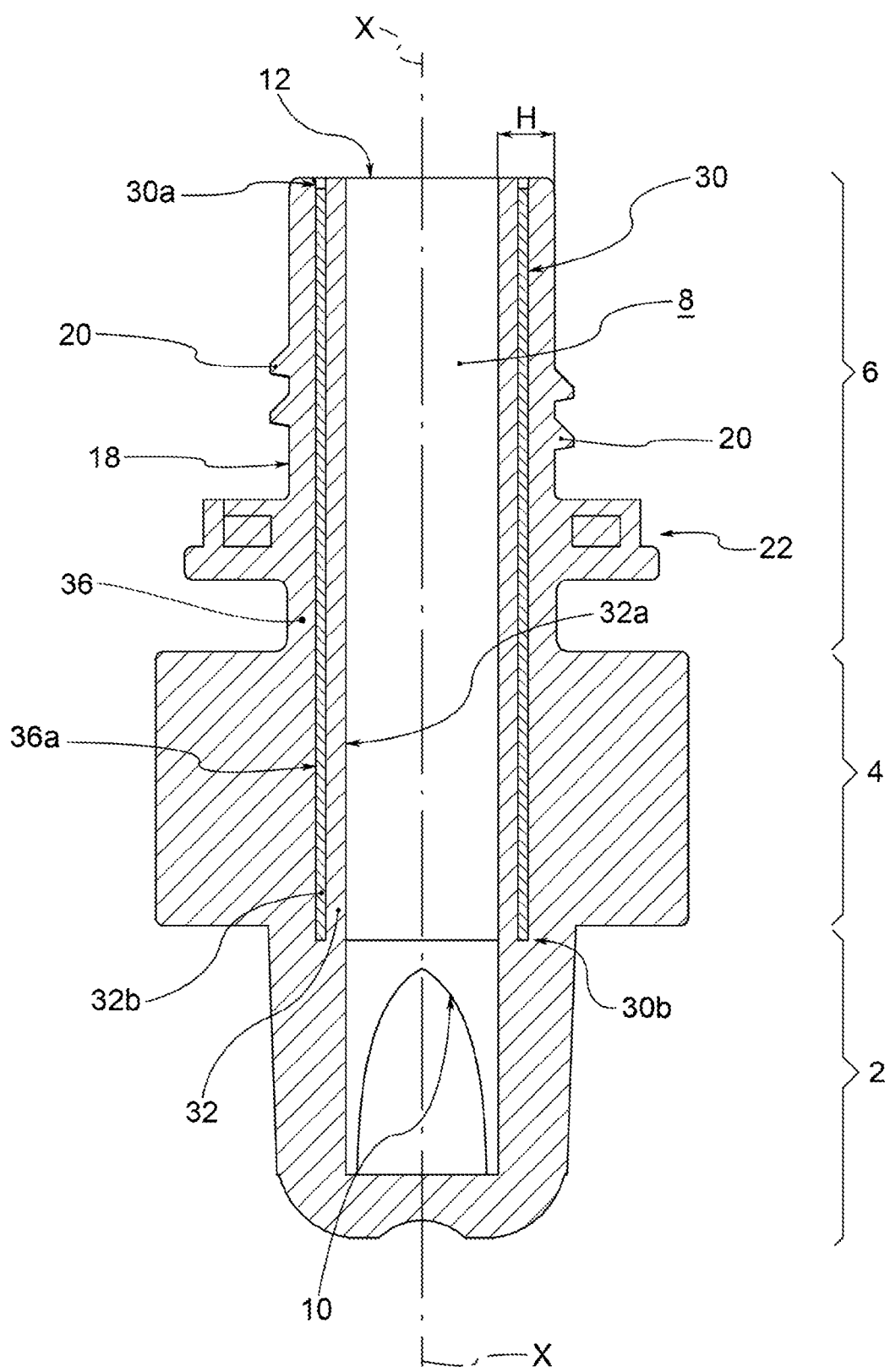
FIG. 5 shows a longitudinal cross-section of the spout in FIG. 1.

With reference to the appended drawings, reference numeral 1 globally denotes a spout for a pouch, in particular a spout for a flexible pouch 100.

For example, the flexible pouch 100 is made from two films 102 of multilayer material, welded along the edges.

Generally, the film 102 comprises an inner layer 106, usually made of polyethylene (PE) or polypropylene (PP), and an outer layer 108, usually made of polyethylene terephthalate (PET) or polypropylene (PP) or polyamide (PA).

Moreover, according to a preferred embodiment, the film 102 comprises an intermediate layer 104, usually made of oxygen impermeable material, for example metal, for example aluminium, or is made of plastic material and coated in silicon oxide or aluminium oxide to make it oxygen impermeable.

The inner layer 106 and outer layer 108 are adherent to the intermediate layer 104.

According to a further embodiment, the pouch provides for bellow sides, generally made with multilayer film of the type described above.

The spout 100 extends substantially along a longitudinal axis X and comprises, from the part remaining inside the pouch 100 towards the outside, a mouth portion 2, a connecting portion 4 and a final portion 6.

Internally, the spout 1 comprises a duct 8, usually of a circular cylindrical shape, which extends along the longitudinal axis X, between a mouth 10 of the mouth portion 2, for example made by windows, and an opening 12 of the end portion 6, delimited annularly by a ring 12a, perpendicular to the longitudinal axis X.

The connecting portion 4 is preferably made by a pair of facing walls 14, with a main extension in the direction perpendicular to the longitudinal axis X, joined at the ends. Said walls form outwardly two engagement surfaces 16 suitable to engage with the films of the pouch 100.

Preferably, the engagement surfaces 16 are joined to the film 102 by welding.

The final portion 6 comprises a tube 18, which extends along the longitudinal axis X, coaxial to the duct 8, having a predetermined radial thickness H.

According to one embodiment, the final portion 6 further comprises a thread 20 for screwing a cap, projecting from the outer surface of the tube 18, for example made by sections of interrupted thread.

According to a variant embodiment, the tube is suitable for stable coupling, by pressing or snapping, with a cap.

Preferably, the cap for the spout 1 is provided with a tamper evident.

Preferably the end portion 6 of the spout 1 comprises an engagement portion 22 adapted to engage with a tamper evident of the cap, to realise an anti-rotation constraint of said tamper evident.

An example of embodiment of a spout provided with a cap provided with a tamper evident engageable with an engagement portion of the spout is described in European patent EP 2076448 granted on behalf of the Applicant, the teaching of the description of which is incorporated herein.

The spout 1 comprises a tubular barrier 30 substantially impermeable to oxygen, extending along the longitudinal axis X starting from the opening end 30a, next to the opening 30 of the tube 18.

The barrier 30 is at least partially embedded in the tube 18, preferably coaxially to it.

According to one embodiment, the tubular barrier 30 extends longitudinally in the spout 1 beyond the tube 18, for example as far as a predefined extension in the connecting portion 4.

Preferably, moreover, the tubular barrier 30 extends longitudinally in the spout 1 beyond the tube 18, completely crossing the connecting portion 4 and extending beyond it, for example to the mouth portion 2, to a mouth end 30b.

Near the opening 12, the tubular barrier 30, preferably does not surface on the ring 12a; on the contrary, it remains embedded in the tube 18.

In other words, the longitudinal end 30a of the tubular barrier 30 is longitudinally spaced from the ring 12a.

The tubular barrier 30 divides the spout into an inner tubular layer 32 and an outer portion 36.

The inner tubular layer 32 is provided with an inner cylindrical surface 32a which is the cylindrical surface of the duct 8, and an outer cylindrical surface 32b, adherent to the outer cylindrical surface of the tubular barrier 30.

The outer portion 36 is instead provided with an inner cylindrical surface 36a adherent to the outer cylindrical surface of the tubular barrier 30.

The inner tubular layer 32 and the outer portion 36 of the spout 1 are made of a first material, preferably the same for both parts, defined oxygen-permeable, food compatible and suitable for welding with the multilayer film of the pouch, such as polyethylene or polypropylene.

The tubular barrier 30 is made of a second material, different from the first, defined oxygen-impermeable, for example a plastic material such as polyethylene terephthalate (PET), polyamide (PA), EVOH (Ethylene vinyl alcohol), or combinations thereof, for example mixtures of EVOH, PE or PP.

The permeability of a material is measured by a parameter called OTR (Oxygen Transmission Rate), expressed in $cc/m^2/day$.

The first material, considered oxygen permeable, has an OTR permeability of between 1500 and 3000, more particularly between 2000 and 2500.

The second material, considered oxygen impermeable, has an OTR permeability between 0.01 and 100, preferably between 0.05 and 0.2 (for example, EVOH), or preferably between 15 and 35 (e.g. polyamide), or preferably between 40 and 80 (for example, PET).

In any case, the second material has an oxygen permeability much lower than that of the first material.

Preferably, the spout 1 is made by injection moulding, using moulding equipment comprising two half-moulds which, when coupled, define an imprint 200 corresponding to the outer shape of the spout, and a counter-mould 300, comprising a fixed insert 302 and a movable skirt 304, fitted so as to slide on the fixed insert 302.

The fixed insert 302 has a shape corresponding to the duct 8 of the spout (and the gaps of the mouth portion 2), while the movable skirt 304 has a shape corresponding to the inner tubular layer 32 of the spout 1.

Figure 6:
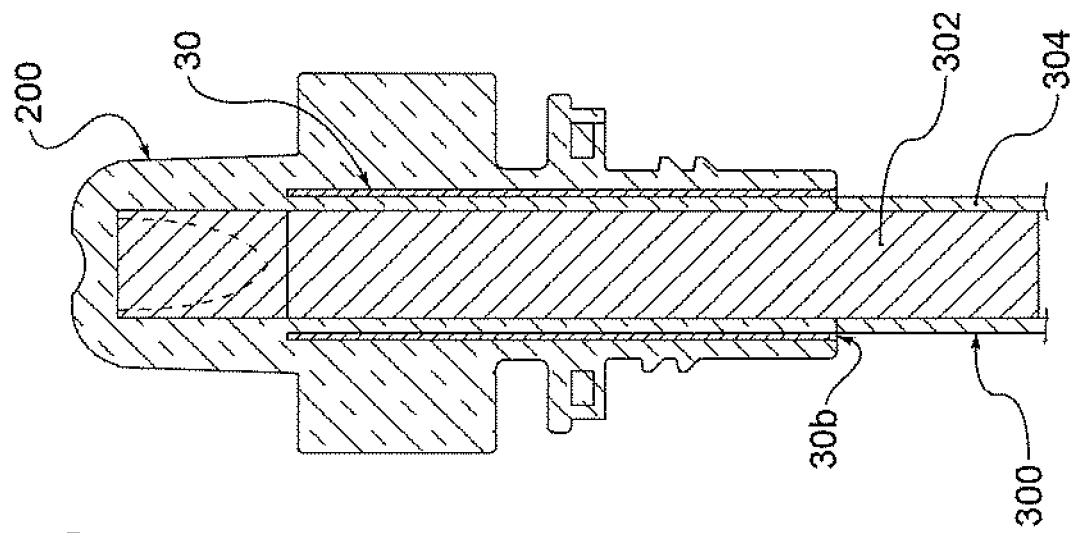
FIGS. 6 to 8 show steps of the production method of the spout according to the present invention.

In an initial configuration of the method (FIG. 6), the fixed insert 302 is inserted in the imprint 200, the barrier 30 is fitted on the skirt 304 and said skirt 304 is in a limit forward position so that the barrier 30 is positioned with respect to the imprint 200 according to the position to be taken in the finished spout 1.

In a subsequent step of the method, the first plastic material of the spout is injected into the imprint 200, filling the empty spaces determined by the counter-mould 300.

Figure 7:
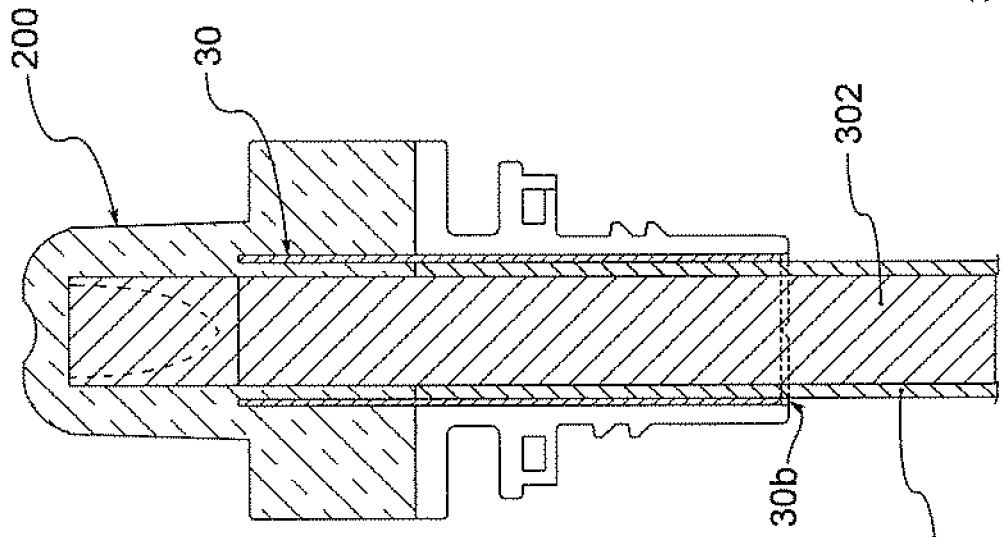

In a synchronized manner with the injection of the first plastic material of the spout, the skirt 304 is driven in translation so as to come out of the imprint 200, at the same time coming out of the barrier 30, which remains in the initial position (FIG. 7). The fixed insert instead remains in the initial position.

As the skirt translates out of the imprint, the space that is created between the insert 302 and the barrier 30 is filled by further first plastic material, which thus forms the inner tubular layer 32 of the spout 1.

Figure 8:
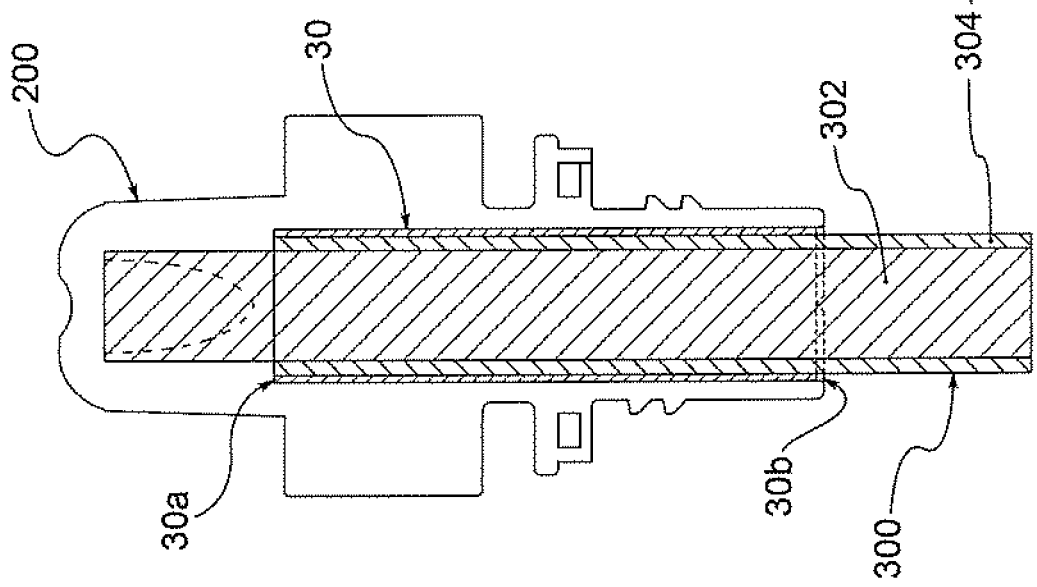

The exit of the skirt 304 preferably proceeds until the entire barrier 30 is covered by the first plastic material (FIG. 8).

Innovatively, the spout according to the present invention overcomes the drawbacks mentioned above with reference to the prior art, since it makes it possible to eliminate or greatly limit the contact between the food substances contained in the pouch and atmospheric oxygen.

In particular, advantageously, the barrier prevents atmospheric oxygen from getting inside the pouch through the thickness.

Advantageously, moreover, the material of the tube does not degrade. In fact, the inner tubular layer prevents contact of the barrier with the liquid foodstuff which, being made up largely of water, would expose the material of the barrier to high humidity, which is often cause of a degradation of the properties of oxygen impermeability.

According to a further advantageous aspect, the spout is inert with respect to food. In fact, the inner tubular layer prevents contact with the barrier, and thus possible, even if remote, food contamination.

Advantageously, moreover, the material of the tube does not degrade. In fact, the inner tubular layer prevents contact of the barrier with the liquid foodstuff which, being made up largely of water, would expose the material of the barrier to high humidity, which is often cause of a degradation of the properties of oxygen impermeability.

According to a further advantageous aspect, the production method is particularly fast and economical.

It is clear that a person skilled in the art may make modifications to the spout and method described above.

For example, according to a variant embodiment, the barrier extends only in the tube of the spout.

According to a further variant embodiment, the barrier directly delimits the duct in the spout, i.e. is not embedded in the tube, but is visible.

Such variations are also included within the scope of protection as defined by the following claims.

The invention claimed is:

1. A method of production of a spout for a flexible pouch, wherein the spout comprises:
   a mouth portion having a mouth for taking liquid;
   a connecting portion for a sealed connection with the pouch;
   an end portion comprising a tube having extension along a longitudinal axis, provided with an opening in connection with the mouth through an internal duct;
   wherein the end portion includes a tubular barrier at least partially embedded in the tube, made of a first plastic material having a permeability to atmospheric oxygen lower than permeability of the remaining part of the spout; and
   wherein the method is executable by a molding equipment comprising:
      two half-molds which, coupled, define a cavity corresponding to an outer shape of the spout;
      a counter-mold, comprising a fixed insert and a movable skirt, wherein the movable skirt is removably slidable on the fixed insert and radially outward of the fixed insert;
   wherein the fixed insert has a shape corresponding to the duct of the spout and the movable skirt has a shape corresponding to an inner tubular layer which delimits the duct and is radially within the tubular barrier;

the method comprising:
- inserting the counter-mold, comprising the fixed insert and the movable skirt into an imprint and fitting the tubular barrier on the skirt to position the tubular barrier in a position corresponding to a tubular barrier position of a finished spout;
- after positioning the tubular barrier, injecting the first plastic material into the two half-molds,
- while slidably translating the skirt outwardly from the imprint, and translating out of the tubular barrier, the tubular barrier remains in a fixed initial position, and the first plastic material engages the skirt and forces the skirt to exit the imprint and fills space between the tubular barrier and the fixed insert.

2. A method according to claim 1, wherein the oxygen transmission rate (OTR) permeability of the material of the tubular barrier is between 0.01 cc/m$^2$/day and 100 cc/m$^2$/day.

3. A method according to claim 1, wherein the tubular barrier is made of a plastic material.

4. A method according to claim 3, wherein the material of the tubular barrier is selected from the group comprising polyethylene terephthalate (PET), polyamide (PA), EVOH or a mixture comprising EVOH, polyethylene (PE) or polypropylene (PP).

5. A method according to claim 1, wherein the tubular barrier extends longitudinally beyond the tube in the connecting portion.

6. A method according to claim 5, wherein the tubular barrier extends longitudinally completely through the connecting portion up to the mouth portion.

7. A method according to claim 1, wherein one end of the tubular barrier is longitudinally spaced from a rim which annularly delimits the opening.

8. A method according to claim 1, wherein the tubular barrier is completely separated from the internal duct by the inner tubular layer.

9. A method according to claim 8, wherein the inner tubular layer is made of a food-grade plastic material.

10. A method according to claim 9, wherein the inner tubular layer is made of polyethylene (PE) or polypropylene (PP).

11. A method according to claim 1, wherein the connecting portion comprises a pair of walls facing externally having respective engagement surfaces intended for engagement with respective films of the pouch.

12. A method according to claim 1, wherein the end portion comprises at least one threading portion for screwing a cap, said threading portion projecting from an outer lateral surface of the tube.

13. A method according to claim 1, wherein the end portion is adapted for engagement with a longitudinal pressure cap or snap cap.

14. A method according to claim 1, wherein the end portion comprises an engagement portion adapted to engage with a tamper evident cap, to create a constraint anti-rotation of said guarantee seal.

15. A method according to claim 1, wherein as the skirt translates out of the imprint, injecting further first plastic material to fill a space created between the fixed insert and the tubular barrier, the further first plastic material forming the inner tubular layer.

16. A method according to claim 1, wherein the movable skirt slides against an outer surface of the fixed insert while the plastic material is inserted.

\* \* \* \* \*